(12) United States Patent
Yuan et al.

(10) Patent No.: US 6,327,454 B1
(45) Date of Patent: Dec. 4, 2001

(54) IMAGABLE SEAMED BELTS HAVING FLUOROPOLYMER ADHESIVE BETWEEN INTERLOCKING SEAMING MEMBERS

(75) Inventors: Xiaoying Elizabeth Yuan, Fairport; Nancy Y. Jia, Webster; Kock-Yee Law, Penfield, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/660,249

(22) Filed: Sep. 12, 2000

(51) Int. Cl.[7] ................................ F16G 1/00; B32B 3/06
(52) U.S. Cl. ......................... 399/303; 428/58; 474/254

(58) Field of Search ........................ 428/58, 57; 474/253, 474/254; 399/303

(56) References Cited

U.S. PATENT DOCUMENTS

| | | | |
|---|---|---|---|
| 5,487,707 | 1/1996 | Sharf et al. | 474/253 |
| 5,514,436 | 5/1996 | Schlueter, Jr. et al. | 428/57 |
| 5,549,193 | 8/1996 | Schlueter, Jr. et al. | 198/844.2 |
| 5,721,032 | 2/1998 | Parker et al. | 428/57 |

*Primary Examiner*—Alexander S. Thomas
(74) *Attorney, Agent, or Firm*—Annette L. Bade

(57) ABSTRACT

A seamed flexible belt having a fluoropolymer adhesive and optional fluoropolymer overcoat for use in the xerographic, contact electrostatic, digital and other like machines, the seam having interlocking seam members.

29 Claims, 8 Drawing Sheets

IMAGABLE SEAMED BELTS HAVING FLUOROPOLYMER ADHESIVE BETWEEN INTERLOCKING SEAMING MEMBERS

CROSS REFERENCE TO RELATED APPLICATIONS

Attention is directed to U.S. patent application Ser. No. 08/004,636 entitled "Process and Apparatus for Producing an Endless Seamed Belt;" abandoned, U.S. patent application Ser. No. 09/493,445, filed Jan. 28, 2000, entitled "Process and Apparatus for Producing an Endless Seamed Belt;" U.S. patent application Ser. No. 09/470,931 filed Dec. 22, 1999, entitled, "Continuous Process for Manufacturing imagable Seamed Belts for Printers; " U.S. patent application Ser. No. 09/088,011, filed May 28, 1998, entitled, "Unsaturated Carbonate Adhesives for Co Seams;" U.S. patent application entitled, "Polyimide Adhesive For Polyimide Component Interlocking Seams" and U.S. patent application entitled, "Process For Seaming Interlocking Seams Of Polyimide Component Using Polyimide Adhesive"; and U.S. patent application entitled, "Imagable Seamed Belts Having Fluoropolymer Overcoat". The disclosures of each of these references are hereby incorporated by reference in their entirety.

BACKGROUND OF THE INVENTION

The present invention is directed to an endless flexible seamed belt wherein an image can be transferred at the seam of the belt with little or no print defects caused by the seam. In embodiments, the present invention relates to xerographic component imagable seamed belts comprising an adhesive formed between mutually mating elements of a seam, wherein the adhesive comprises a fluoropolymer material. In a particularly preferred embodiment, an overcoat, and preferably a fluoropolymer overcoat, is positioned over the fluoropolymer adhesive bound seam. The present invention, in embodiments, provides a belt in which the seam has compatible electrical and release properties with the rest of the belt. The present invention further provides, in embodiments, a belt having a seam with increased strength. The present invention, in embodiments, also provides a belt having a seam in which the height differential between the seam and the rest of the belt is virtually nil. The belt, in embodiments, allows for image transfer at the seam, which cannot be accomplished with known seamed belts.

In a typical electrostatographic reproducing apparatus such as an electrophotographic imaging system using a photosensitive member, a light image of an original to be copied is recorded in the form of an electrostatic latent image upon a photosensitive member and the latent image is subsequently rendered visible by the application of a developer mixture. One type of developer used in such printing machines is a liquid developer comprising a liquid carrier having toner particles dispersed therein. Generally, the toner is made up of resin and a suitable colorant such as a dye or pigment. Conventional charge director compounds may also be present. The liquid developer material is brought into contact with the electrostatic latent image and the colored toner particles are deposited thereon in image configuration.

The developed toner image recorded on the imaging member is transferred to an image receiving substrate such as paper via a transfer member. The toner particles may be transferred by heat and/or pressure to a transfer member, or more commonly, the toner image particles may be electrostatically transferred to the transfer member by means of an electrical potential between the imaging member and the transfer member. After the toner has been transferred to the transfer member, it is then transferred to the image receiving substrate, for example by contacting the substrate with the toner image on the transfer member under heat and/or pressure.

Transfer members enable high throughput at modest process speeds. In four-color photocopier or printer systems, the transfer member also improves registration of the final color toner image. In such systems, the four component colors of cyan, yellow, magenta and black may be synchronously developed onto one or more imaging members and transferred in registration onto a transfer member at a transfer station.

In electrostatographic printing and photocopy machines in which the toner image is transferred from the transfer member to the image receiving substrate, it is desired that the transfer of the toner particles from the transfer member to the image receiving substrate be substantially 100 percent. Less than complete transfer to the image receiving substrate results in image degradation and low resolution. Complete transfer is particularly desirable when the imaging process involves generating full color images since undesirable color deterioration in the final colors can occur when the color images are not completely transferred from the transfer member.

Thus, it is desirable that the transfer member surface has excellent release characteristics with respect to the toner particles. Conventional materials known in the art for use as transfer members often possess the strength, conformability and electrical conductivity necessary for use as transfer members, but can suffer from poor toner release characteristics, especially with respect to higher gloss image receiving substrates.

Polyimide substrate transfer members are suitable for high performance applications because of their outstanding mechanical strength and thermal stability, in addition to their good resistance to a wide range of chemicals. However, the high cost of manufacturing unseamed polyimide belts has led to the introduction of a seamed belt. Even polyimides with the best mechanical and chemical properties often exhibit poor adhesion at the seam even when commercially available primers are used.

In the electrostatic transfer applications, use of a seamed transfer polyimide member results in insufficient transfer in that the developed image occurring on the seam is not adequately transferred. This incomplete transfer is partially the result of the difference in seam height to the rest of the belt. A "bump" is formed at the seam, thereby hindering transfer and mechanical performance. The development of puzzle cut seams has increased the quality of transfer somewhat, by decreasing the seam height, thereby allowing smooth cycling. However, even with the improvements made with puzzle cut seams, quality imaging in the seamed area is not obtainable at present due, in part, to contrast in transfer caused by differences in electrical and release properties of known seaming adhesives. Further, current adhesives do not provide sufficient bonding strength at the seam, resulting in short belt life. In addition, the seam must have the appropriate surface properties in order to allow for sufficient toner release at the seam.

Currently, puzzle cut seam adhesives consist of uv-curable epoxies and hot-melt adhesives. While these adhesives exhibit acceptable strengths at room temperature under tensile load, most undergo premature failure at elevated temperatures. Additionally, the existing adhesives have been found to perform poorly under some important dynamic test conditions.

Therefore, it is desired to provide a more robust adhesive system useful to seam puzzle cut seamed belts. It is further desirable to provide an adhesive system that allows the seam to have thermal and mechanical characteristics closely matching those of the robust substrate. Further, it is desired to provide an adhesive having electrical, mechanical and toner release characteristics that closely match those of the substrates. In addition, it is desirable to provide a seam which is imagable, thereby reducing or eliminating the presence of print or copy defects.

U.S. Pat. No. 5,549,193 relates to an endless flexible seamed belt comprising puzzle cut members, wherein at least one receptacle has a substantial depth in a portion of the belt material at the belt ends.

U.S. Pat. No. 5,721,032 discloses a puzzle cut seamed belt having a strength-enhancing strip.

U.S. Pat. No. 5,487,707 discloses a puzzle cut seamed belt having a bond between adjacent surfaces, wherein an ultraviolet cured adhesive is used to bond the adjacent surfaces.

U.S. Pat. No. 5,514,436 relates to a puzzle cut seamed belt having a mechanically invisible seam, which is substantially equivalent in performance to a seamless belt.

SUMMARY OF THE INVENTION

Embodiments of the present invention include: an endless seamed flexible belt comprising a first end and a second end, each of the first end and the second end comprising a plurality of mutually mating elements which join in an interlocking relationship to form a seam, the belt comprising a substrate and the seam comprising a fluoropolymer adhesive.

In addition, embodiments of the present invention include: an endless seamed flexible belt comprising a first end and a second end, each of the first end and the second end comprising a plurality of mutually mating elements which join in an interlocking relationship to form a seam, said belt comprising a polyimide substrate, and the seam comprising a fluorinated polyurethane adhesive having conductive fillers dispersed or contained therein.

Embodiments further include: an image forming apparatus for forming images on a recording medium comprising: a charge-retentive surface to receive an electrostatic latent image thereon; a development component to apply toner to the charge-retentive surface to develop the electrostatic latent image to form a developed image on said charge retentive surface; a transfer belt to transfer the developed image from the charge retentive surface to a copy substrate, wherein the transfer belt is an endless seamed flexible belt comprising a first end and a second end, each of the first end and the second end comprising a plurality of mutually mating elements which join in an interlocking relationship to form a seam, the transfer belt comprising a substrate and the seam comprising a fluoropolymer adhesive; and a fixing component to fuse the developed image to the copy substrate.

BRIEF DESCRIPTION OF THE DRAWINGS

For a better understanding of the present invention, reference may be had to the accompanying figures.

DETAILED DESCRIPTION OF THE PRESENT INVENTION

The present invention relates to an endless flexible seamed belt having a puzzle cut seam, wherein the seam comprises a fluoropolymer adhesive. The fluoropolymer adhesive in the seam provides a seam, in embodiments, which is imagable and wherein the occurrence of copy and print defects at the seam is reduced or eliminated. The present invention further provides a belt wherein the seam and belt material share electrical, mechanical and toner release characteristics. The present invention further provides, in embodiments, a belt having virtual uniform thickness at the seam. The present invention, in embodiments, provides a seamed belt having enhanced bonding strength at the seam.

In preferred embodiments, the belt is an intermediate transfer belt, sheet, roller, or film useful in xerographic, including digital, apparatuses. However, the belts herein having a seam comprising a fluoropolymer adhesive, can be useful as belts, rollers, drelts, and the like, for many different processes and components such as photoreceptors, fusing members, transfix members, bias transfer members, bias charging members, developer members, image bearing members, conveyor members, cleaning members, and other members for contact electrostatic printing applications, xerographic applications, including digital, and the like. Further, the belts, herein, can be used for both liquid and powder xerographic architectures.

Figure 1:
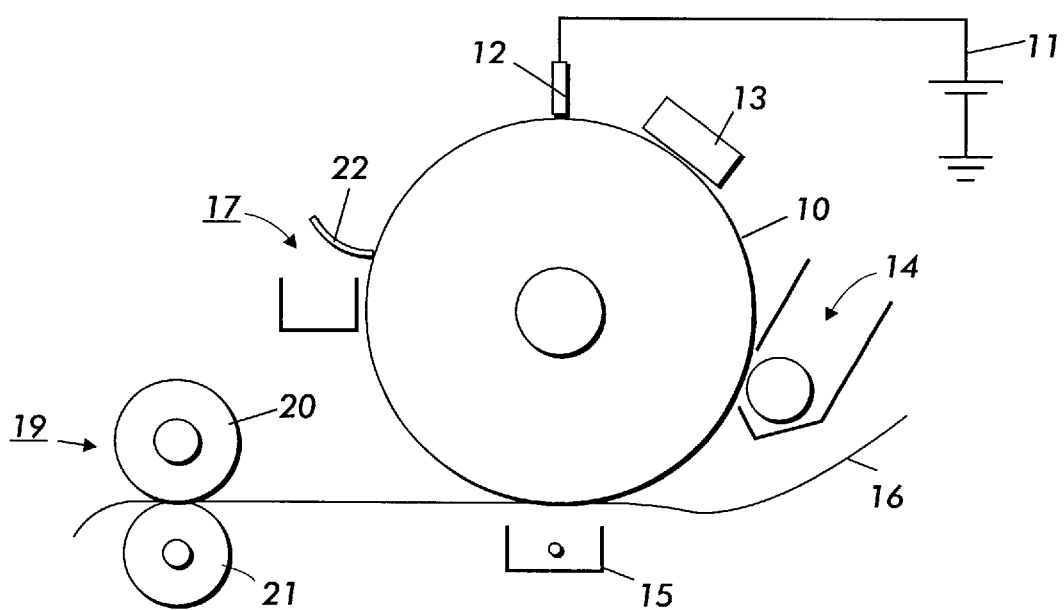
FIG. 1 is a depiction of an electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer. Preferably, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Fusing may be accomplished by other fusing members such as a fusing belt in pressure contact with a pressure roller, fusing roller in contact with a pressure belt, or other like systems. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
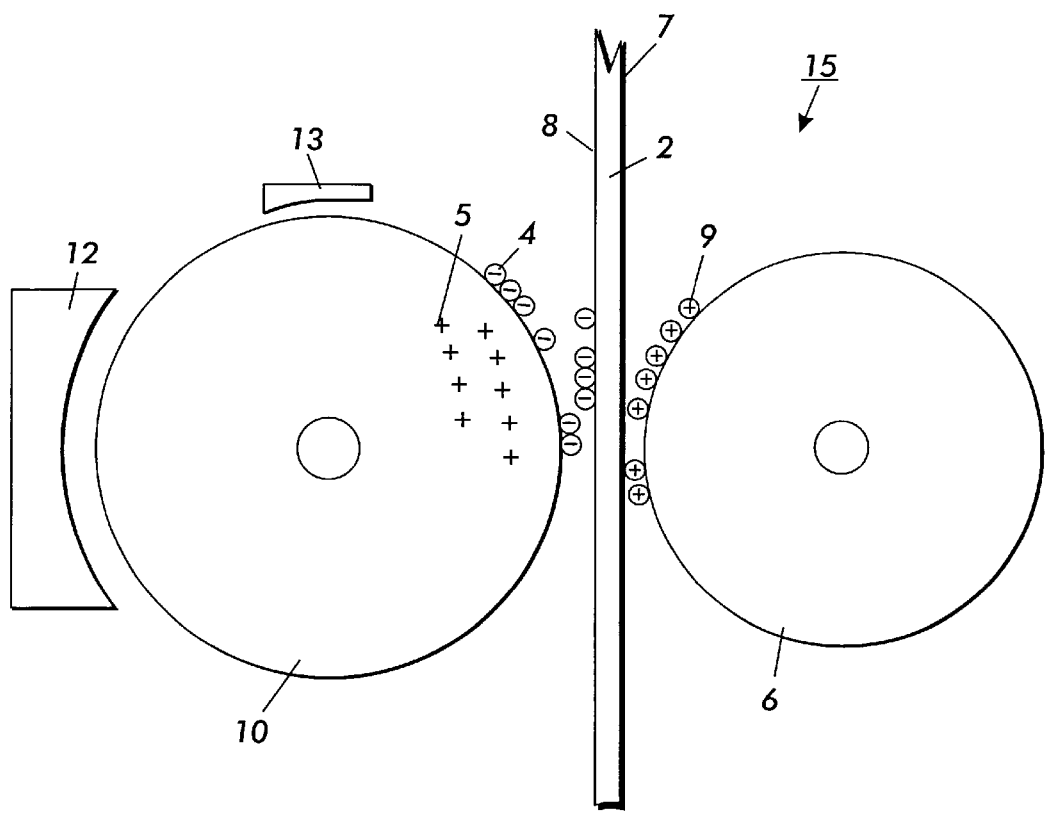
FIG. 2 is an enlargement of a transfer system according to an embodiment of the present invention.

FIG. 2 is a schematic view of an image development system containing an intermediate transfer member. FIG. 2 demonstrates another embodiment of the present invention and depicts a transfer apparatus 15 comprising a transfer member 1 positioned between an imaging member 10 and a transfer roller 6. The imaging member 10 is exemplified by a photoreceptor drum. However, other appropriate imaging members may include other electrostatographic imaging receptors such as ionographic belts and drums, electrophotographic belts, and the like.

In the multi-imaging system of FIG. 2, each image being transferred is formed on the imaging drum by image forming station 12. Each of these images is then developed at developing station 13 and transferred to transfer member 2. Each of the images may be formed on the photoreceptor drum 10 and developed sequentially and then transferred to the transfer member 2. In an alternative method, each image may be formed on the photoreceptor drum 10, developed, and transferred in registration to the transfer member 2. In a preferred embodiment of the invention, the multi-image system is a color copying system. In this color copying system, each color of an image being copied is formed on the photoreceptor drum. Each color image is developed and transferred to the transfer member 2. As above, each of the colored images may be formed on the drum 10 and developed sequentially and then transferred to the transfer member 2. In the alternative method, each color of an image may be formed on the photoreceptor drum 10, developed, and transferred in registration to the transfer member 2.

After latent image forming station 12 has formed the latent image on the photoreceptor drum 10 and the latent image of the photoreceptor has been developed at developing station 13, the charged toner particles 4 from the developing station 13 are attracted and held by the photoreceptor drum 10 because the photoreceptor drum 10 possesses a charge 5 opposite to that of the toner particles 4. In FIG. 2, the toner particles are shown as negatively charged and the photoreceptor drum 10 is shown as positively charged. These charges can be reversed, depending on the nature of the toner and the machinery being used. In a preferred embodiment, the toner is present in a liquid developer. However, the present invention, in embodiments, is useful for dry development systems also.

A biased transfer roller 6 positioned opposite the photoreceptor drum 10 has a higher voltage than the surface of the photoreceptor drum 10. As shown in FIG. 2, biased transfer roller 6 charges the backside 7 of transfer member 2 with a positive charge. In an alternative embodiment of the invention, a corona or any other charging mechanism may be used to charge the backside 7 of the transfer member 2.

The negatively charged toner particles 4 are attracted to the front side 8 of the transfer member 2 by the positive charge 9 on the backside 7 of the transfer member 2.

Figure 3:
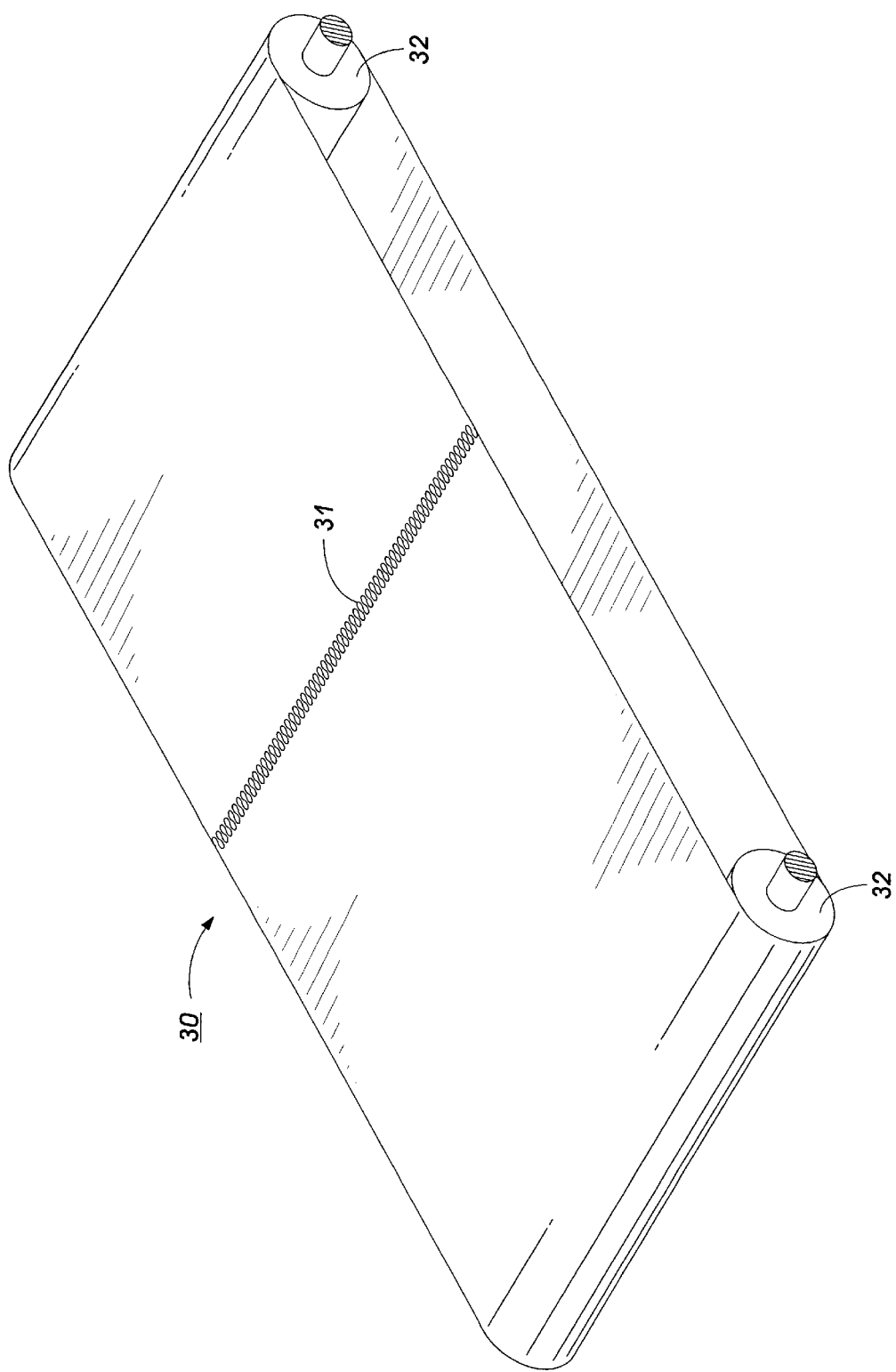
FIG. 3 is an enhanced view of an embodiment of a belt configuration and seam according to the present invention.

FIG. 3 demonstrates an example of an embodiment of a belt in accordance with the present invention. Belt 30 is demonstrated with seam 31. Seam 31 is pictured as an example of one embodiment of a puzzle cut seam. The belt is held in position and turned by use of rollers 32. Note that the mechanical interlocking relationship of the seam 31 is present in a two-dimensional plane when the belt 30 is on a flat surface, whether it be horizontal or vertical. While the seam is illustrated in FIG. 3 as being perpendicular to the two parallel sides of the belt, it should be understood that it may be angled or slanted with respect to the parallel sides. This enables any noise generated in the system to be distributed more uniformly and the forces placed on each mating element or node to be reduced.

The seam formed according to the present invention is one having a thin and smooth profile, of enhanced strength, improved flexibility and extended mechanical life. In a preferred embodiment, the belt ends are held together by is the geometric relationship between the ends of the belt material, which are fastened together by a puzzle cut. The puzzle cut seam can be of many different configurations, but is one in which the two ends of the seam interlock with one another in a manner of a puzzle. Specifically, the mutually mating elements comprise a first projection and a second receptacle geometrically oriented so that the second receptacle on the first end receives the first projection on the second end and wherein the first projection on the first end is received by the second receptacle on the second end. The seam has a kerf, void or crevice between the mutually mating elements at the two joining ends of the belt, and that crevice can be filled with an adhesive according to the present invention. The opposite surfaces of the puzzle cut pattern are bound or joined together to enable the seamed flexible belt to essentially function as an endless belt. In the present invention, the seam including the puzzle cut members, is held together by a fluoropolymer adhesive, which is compatible with the rest of the belt. The belt, in embodiments, provides improved seam quality and smoothness with substantially no thickness differential between the seam and the adjacent portions of the belt.

Figure 4:
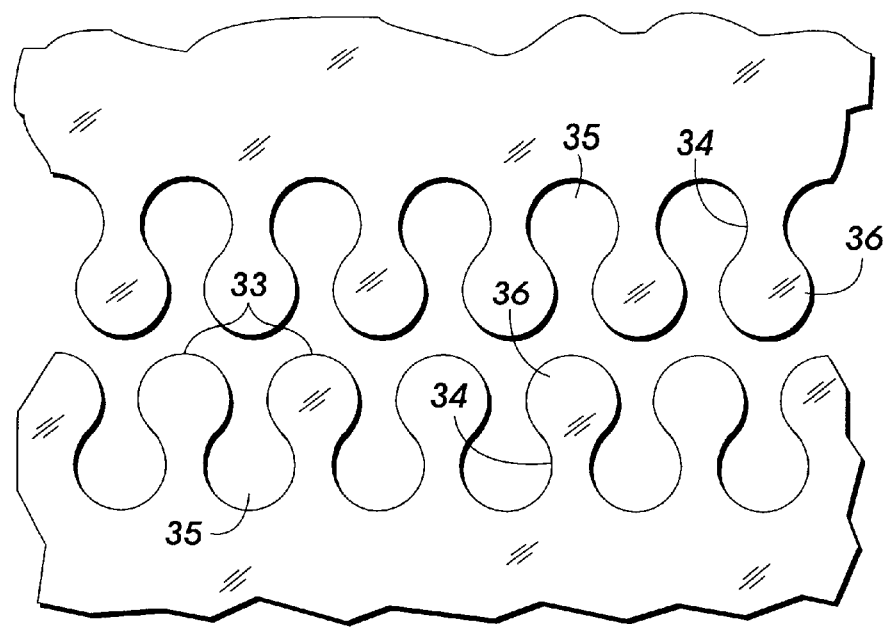
FIG. 4 is an enlargement of a puzzle cut seam having a head and neck members according to one embodiment of the present invention.
Figure 5:
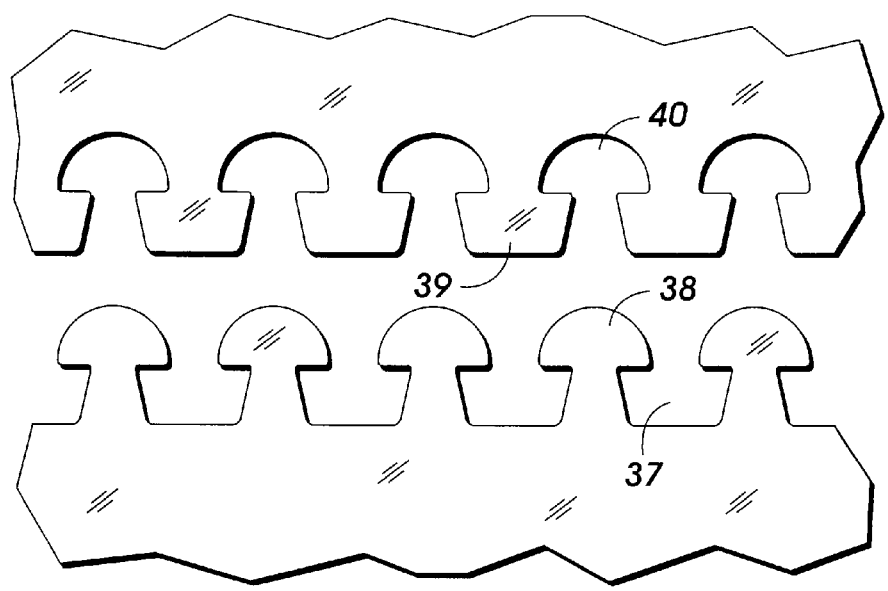
FIG. 5 is an enlargement of a puzzle cut seam having mushroom-shaped puzzle cut members according to another embodiment of the present invention.
Figure 6:
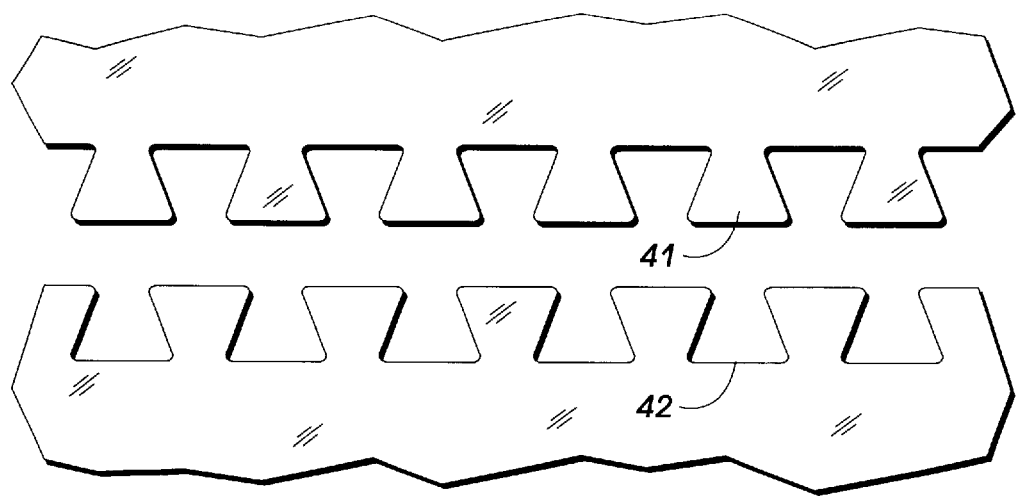
FIG. 6 is an enlargement of a puzzle cut seam having dovetail members according to another embodiment of the present invention.
Figure 7:
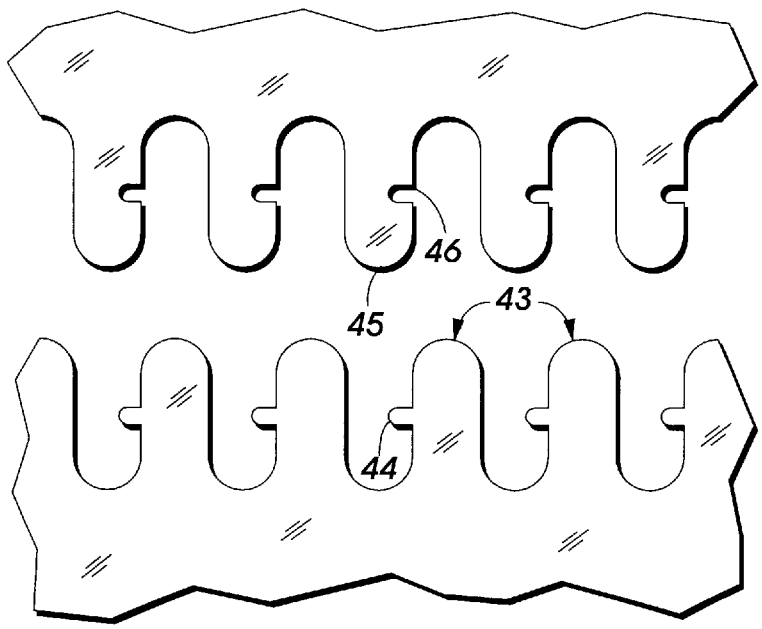
FIG. 7 is an enlargement of a puzzle cut seam having recessor and teeth members according to another embodiment of the present invention.

An example of an embodiment of a puzzle cut seam having two ends, each of the ends comprising puzzle cut members or mutually mating elements is shown in FIG. 4. The puzzle cut pattern may take virtually any form, including that of nodes such as identical post or neck 34 and head 33 or node patterns having projections 36 and receptacles 35 which interlock when brought together as illustrated in FIG. 4. The puzzle cut pattern may also be of a more mushroom-like shaped pattern having first projections 38 and 39 and second receptacles 40 and 37 as illustrated in FIG. 5, as well as a dovetail pattern as illustrated in FIG. 5 having first projections 41 and second receptacles 42. The puzzle cut pattern illustrated in FIG. 7 has a plurality of first fingers 43 with interlocking teeth 44 and plurality of second fingers 45 which have recesses 46 to interlock with the teeth 44 when assembled. It is preferred that the interlocking elements all have curved mating elements to reduce the stress concentration between the interlocking elements and permit them to separate Is when traveling around curved members such as the rolls 32 of FIG. 3. It has been found that with curved mating elements that the stress concentration is lower than with square corners where rather than the stress being uniformly distributed it is concentrated leading to possible failure.

Figure 8:
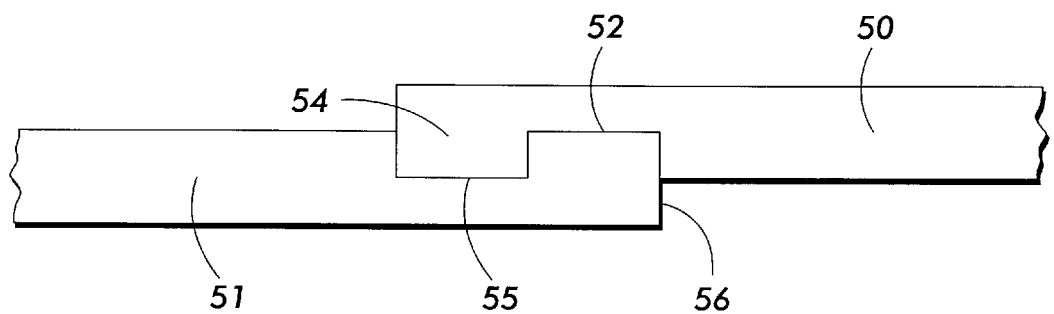
FIG. 8 is an enlargement of a puzzle cut seam having receptacle and projection members of differing depth according to another embodiment of the present invention.

Another example of a puzzle cut seam is shown in FIG. 8 in which the mutually mating elements or puzzle cut members comprise a first member 50 and a second member 51, wherein the first member 50 comprises a first receptacle 52 and a first projection 54, and the second member 51 comprises a second receptacle 55 and a second projection 56. The first receptacle 52 of the first member 50 receives the second projection 56 of the second member 51, and the second receptacle 55 of the second member 51 receives the first projection 54 of the first member 50. In order to reduce the height differential between the seamed portion and the adjacent, unseamed portion of the belt, it is desirable to have the second receptacles formed within their individual members at a substantial depth in a portion of the belt as the belt ends.

It is preferred that the height differential between the seam and the rest of the belt (the nonseamed portions of the belt) be practically nil, or from about 0 to about 25 micrometers, preferably from about 0.0001 to about 25 micrometers, and particularly preferred of from about 0.01 to about 15 micrometers.

Figure 9:
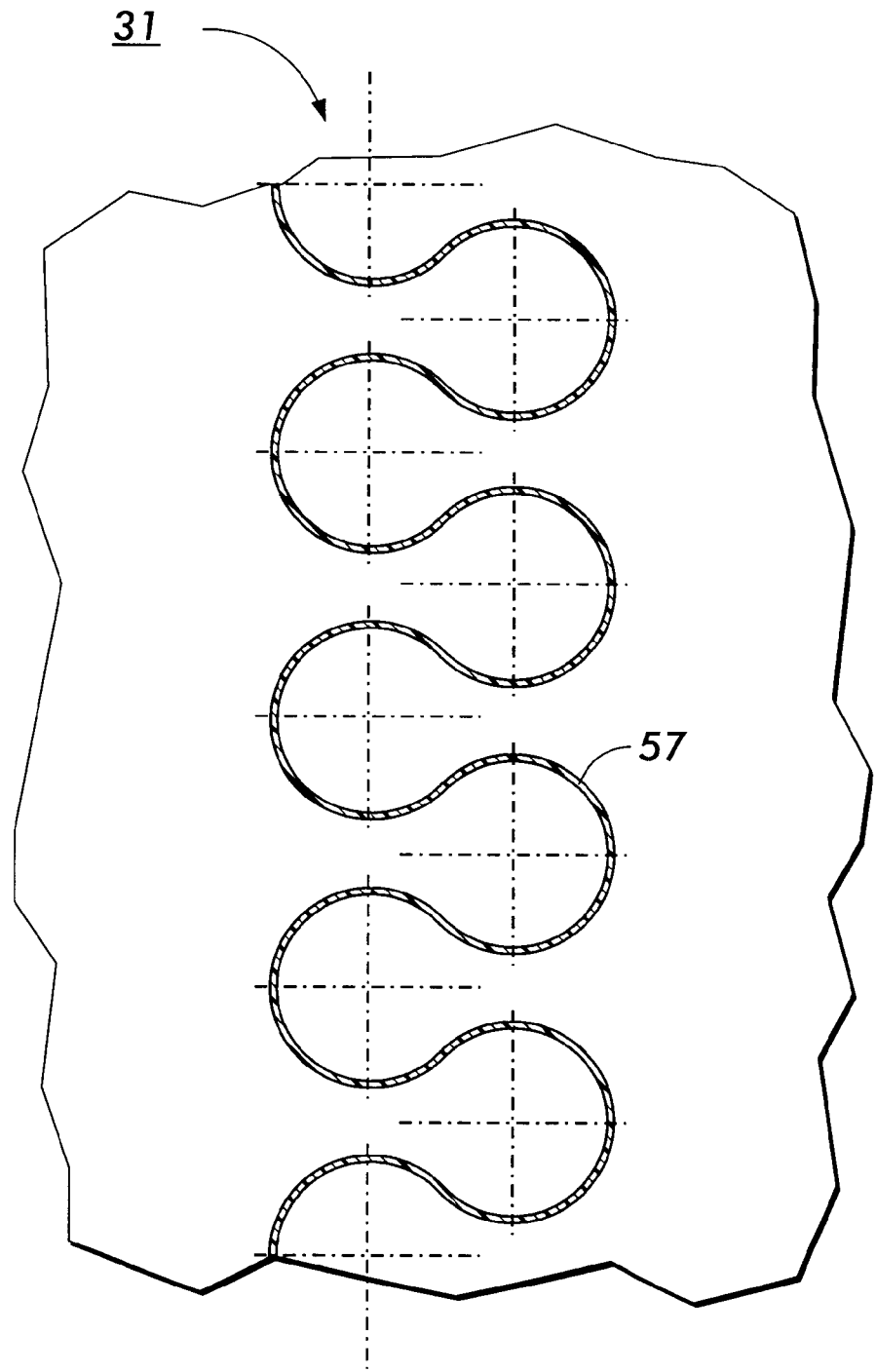
FIG. 9 is an enlarged version of a belt according to one embodiment of the present invention and demonstrates a crevice between the puzzle cut members, the crevice containing an adhesive.

A fluoropolymer adhesive is preferably present between the seam, and placed in the crevice between the puzzle cut members to a thickness of from about 0.0001 to about 25 micrometers. As shown in one embodiment of a puzzle cut seam 31 according to the present invention, the adhesive is present between the puzzle cut members and at the seam crevice 57 of FIG. 9.

The adhesive is preferably chosen to have a resistivity within the range desired for electrostatic transfer of toner. Preferably, the resistivity of the seam is the same or similar to that of the belt in order to provide the same electrical properties for the seam and the rest of the belt. A preferred surface resistivity range for toner transfer performance is from about $10^2$ to about $10^{15}$ ohms/sq, preferably from about $10^8$ to about $10^{12}$ ohms/sq, and a preferred volume resistivity for toner transfer performance is preferably from about $10^9$ to about $10^{11}$ ohms-cm. When the belt and the seam of the belt have a same or substantially the same electrical resistance, the toner transfer at the seam is the same or substantially the same as the transfer at the belt. Such transfer at the seam provides an invisible or substantially invisible seam.

The electrical properties can be controlled by varying the amount of fillers, by changing the type of filler added, and/or by changing the curing procedure.

A preferred adhesive for use with a belt seam, preferably a puzzle cut belt seam, is a fluoropolymer adhesive, and in preferred embodiments, a semiconductive fluoropolymer adhesive.

Preferred adhesives include polymers of fluorinated urethanes such as fluoroethylene vinyl ether based polyurethanes, fluorinated epoxy polyurethane, fluorinated acrylic polyurethanes, and the like, and polymers thereof and mixtures thereof. A particularly preferred adhesive is a copolymer of polyfluoroethylene and vinyl ether based polyol with aliphatic or aromatic isocyanates. Commercially available resins for adhesives include fluoropolymers having the trademark LUMIFLON® (particularly preferred are the LUMIFLON® 600 series and 400 series) from Zeneca, FLOMBINS® and FLUOROBASE® from Ausimont, FLUONATEO® from Dainippon, ZAFLONO® from Toa Gosei, and the like.

It is preferred to add fillers to the substrate and/or to the adhesive so as to impart desired electrical resistivity. Examples of suitable fillers for use herein include carbon fillers, metal oxide fillers, doped metal oxide fillers, other metal fillers, other conductive fillers, and the like. Specific examples of fillers include carbon fillers such as carbon black, fluorinated carbon black, graphite, low conductive carbon, and the like, and mixtures thereof; metal oxides such as indium tin oxide, zinc oxide, iron oxide, aluminum oxide, copper oxide, lead oxide, and the like, and mixtures thereof; doped metal oxides such as antimony-doped tin oxide, antimony-doped titanium dioxide, aluminum-doped zinc oxide, similar doped metal oxides, and mixtures thereof; and polymer particles such as polytetrafluoroethylene, polypyrrole, polyannaline, doped polyanaline and the like, and mixtures thereof. Preferred commercially available fillers include fluorinated carbon (such as ACCUFLUOR® from Allied Signal of Morristown, N.J.), ZELEC® (antimony doped tin oxide) available from DuPont, Wilmington, Del., Baytron® P, Baytron® M (polymer which contain polyethylendioxythiophene) from Bayer Corporation, Pittsburgh, Pa.

Preferred fluorinated carbons include those having the formula $CF_x$ with x representing the number of fluorine atoms and generally being up to about 1.5, preferably from about 0.01 to about 1.5, and particularly preferred from about 0.04 to about 1.4. Other preferred fluorinated carbons are poly(dicarbon monofluoride) which is usually written in the shorthand manner $(C_2F)_n$. Preferred fluorinated carbons selected include those described in U.S. Pat. No. 4,524,119 to Luly et al., the subject matter of which is hereby incorporated by reference in its entirety, and those having the tradename ACCUFLUORO®, (ACCUFLUOR® is a registered trademark of Allied Signal, Morristown, N.J.) for example, ACCUFLUORR® 2028, ACCUFLUOR® 2065, ACCUFLUORO® 1000, and ACCUFLUOR® 2010. ACCUFLUOR® 2028 and ACCUFLUOR® 2010 have 28 and 11 percent by weight fluorine, respectively, based on the weight of fluorinated carbon. ACCUFLUOR® 1000 and ACCUFLUOR® 2065 have 62 and 65 percent by weight fluorine, respectively, based on the weight of fluorinated carbon. Also, ACCUFLUOR® 1000 comprises carbon coke, whereas ACCUFLUOR® 2065, 2028 and 2010 all comprise conductive carbon black. These fluorinated carbons are of the formula $CF_x$ and are formed by the reaction of $C+F_2=CF_x$.

Preferably, the filler, if present in the substrate, is present in an amount of from about 1 to about 60, and preferably from about 3 to about 40 percent by weight of total solids. Total solids, as used herein, refers to the amount of solids present in the substrate, layer, or adhesive. The filler, if present in the adhesive, is preferably present in an amount of from about 2 to about 40, and preferably from about 5 to about 30 percent by weight of total solids.

The adhesive solution may be applied by any suitable means such as using a cotton tipped applicator, liquid dispenser, glue gun and other known means.

By tailoring the conductivity of the seam region to match that of the entire belt, images with little or no loss of print quality at the seam can be achieved. Tailoring the conductivity can be achieved, for example, by varying the amounts and kinds of fillers in the fluoropolymer adhesive and/or in the substrate.

The seam can then be cured by various methods. Curing procedures useful in curing the seam include room temperature moisture curing, thermal curing and infrared curing. Examples of heat curing include use of moderate heat once the adhesive is placed in the seam crevice. This moderate heating also increases the crosslinking/solidification reaction and increases the seam processing and belt fabrication speed. Desired temperature includes from about 40 to about 200° C., preferably from about 80 to about 150° C., at a time of from about 30 seconds to about 24 hours, preferably from about 15 minutes to about 3 hours, and particularly preferred, from about 30 minutes to about 1 hour. Heat may be applied by, for example, a heat gun, oven, or other suitable means.

By applying the adhesive to the seam and forming the virtual seam as indicated, a cost savings of at least 5 times the cost of a coated seam results.

Figure 10:
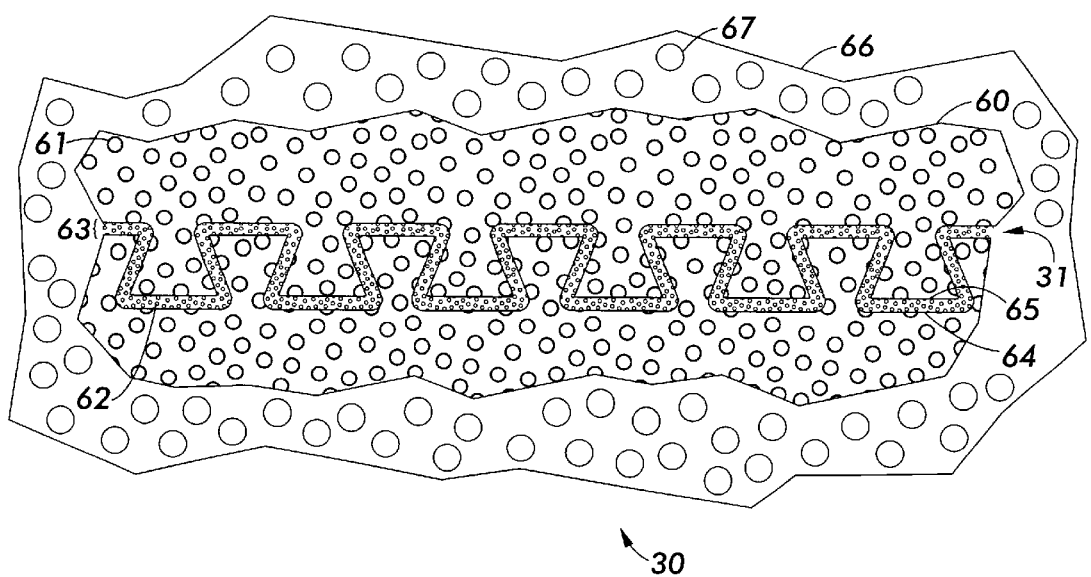
FIG. 10 is an enlarged cross-sectional view of a belt according to a preferred embodiment of the invention.

An example of a preferred belt used in combination with the fluoropolymer adhesive is depicted in FIG. 10. The belt 30 comprises a substrate 60, having therein, in preferred embodiments, conductive fillers 61. The belt contains seam 31 having an adhesive 63 positioned between the seam members 64 and 65. In a preferred embodiment, conductive fillers 62 are dispersed or contained in the fluoropolymer adhesive. In a preferred embodiment of the invention, an overcoat 66 is provided in the substrate 60. The overcoat may contain conductive fillers 67. Conductive fillers 61 optionally dispersed or contained in the substrate, fillers 67 optionally dispersed or contained in the optional overcoat, and fillers 62 optionally contained or dispersed in the fluoropolymer adhesive, may be the same or different. Examples of suitable substrate materials include semiconductive polyimides such as polyanaline polyimide, carbon filled polyimides, carbon filled polycarbonate, and the like. Examples of commercially available polyimide substrates include KAPTON® and UPLIEX® both from DuPont, and ULTEM from GE.

In particularly preferred embodiment of the invention, an overcoat is coated on the substrate following seaming with the fluoropolymer adhesive. Preferred overcoats include fluoropolymer overcoats. Examples of fluoropolymers useful as overcoats include fluorinated ethylene vinyl ether (FEVE) based fluoropolymers and fluorinated acrylic. More specific examples include FLOURAD FC725 and FC280® from 3M Company, fluoropolymers having the trademark LUMIFLONO® (particularly preferred are the LUMIFLON® 600 series, 400 series and 200 series) from Zeneca, and the like.

In the preferred embodiment wherein a coating is applied to the substrate following seaming, it is preferred to add a filler to the coating. Examples of suitable fillers include the fillers listed above as suitable for use in the fluoropolymer adhesive and include carbon fillers, metal oxide fillers, doped metal oxide fillers, other conductive filers, and the like. A particularly preferred filler is fluorinated carbon such as ACCUFLUOR®, as described above.

The fluoropolymer adhesive provides an excellent seam adhesive for belts, and in preferred embodiments, polyimide intermediate transfer belts. The fluoropolymer adhesives, in embodiments, have the same or similar mechanical and surface release properties as the substrates. Further, the fluoropolymer adhesives, in embodiments, provide good bonding strength to the substrate seam members. The resistivity of the adhesives can be tuned into the same range as the substrate by changing the loading level of the conductive filler, by mixing different ratios of the conductive fillers, or by varying curing conditions. Applying the adhesive to the seam provides a simpler and cost efficient method of seaming as compared to preparing a seam using an overcoating technique. The cost savings is about 5 times.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example 1
Preparation of Intermediate Transfer Belt

A polyimide intermediate transfer belt was obtained from DuPont. The belt substrate comprised polyaniline-doped polyimide. The resistivity was tested and found to be from about $10^{12}$ to about $10^{13}$ ohm/sq.

Example 2
Preparation of Fluoropolymer Adhesive Seam

A fluoropolymer adhesive was prepared by mixing about 20 grams fluoropolymer resin with about 1 gram isocyanate (DESMODUR® N3300 from Bayer Corporation). Three different adhesive solutions were prepared using one of the fluoropolymers LUMIFLON® 200, 400 and 600 from Zeneca Resin. The adhesive solution was roll milled for about 30 minutes. Subsequent to the roll milling, the adhesive solution was dried at about 30° C. in a forced air oven for about 1 hour and post cured at approximately 100° C. for about 30 minutes.

Example 3
Preparation of Fluorinated Carbon-Filled Fluoropolymer Adhesive

About 20 grams of LUMIFLON® 200 was mixed with about 1 grams N3300® from Bayer Corporation. About 1 gram of fluorinated carbon (ACCUFLUOR® 2028 or 2010 from Advance Research Chemicals, Inc.) was mixed with about 20 grams methyl ethyl ketone on a roll mill for about 30 minutes. Subsequently, about 0.01 grams of a DBTDL (dibutyl tin dilaurate from AirProduct) was mixed with about 20 grams methyl ethyl ketone. The final adhesive solution was well mixed on a roll mill and applied to a puzzle cut interlock seam of the polyimide substrate of Example 1. The film was then dried at about 30° C. for about 20 minutes and cured for about 30 minutes at a temperature of approximately 100° C.

Example 4
Preparation of Fluorinated Carbon-Filled Fluoropolymer Overcoat

About 20 grams of LUMIFLON® 200 was mixed with about 0.3 grams RESIMENE® 747 from Solutia. About 1 gram of fluorinated carbon (ACCUFLUOR® 2028 or 2010 from Advance Research Chemicals, Inc. was mixed with about 20 grams methyl ethyl ketone on a roll mill for about 30 minutes. Subsequently, about 0.005 grams of P-TSA (para-toluene sulfonic acid from Aldrich) was mixed with about 20 grams methyl ethyl ketone. The final coating solution was well mixed on a roll mill and coated on to the polyimide substrate of Example 1. The coating was then dried at about 30° C. for about 30 minutes and cured for about 30 minutes at a temperature of approximately 150° C.

Example 5
Preparation of Fluoropolymer Overcoat

About 20 grams of a fluoropolymer resin (LUMIFLON® 200 from Zeneca Resin) was mixed with about 0.005 grams P-TSA from Aldrich, about 20 grams methyl ethyl ketone and about 0.3 grams RESIMENE® 747 from Solutia. The coating solution was mixed under a roll mill for about 30 minutes and then coated on seamed substrates.

This polyaniline doped polyimide overcoat with crosslinkable Lumiflon 200 and Resimene 747 was tested by placing the belt in a Xerox copy machine and running several test runs. After the developed image was transferred to the copy substrate, the overcoat surface was analyzed. There was no trace of toner residual left on the overcoat surface subsequent to transfer of the developed image to a copy substrate.

Delamination tests were also performed using the ASTM D3359 standard test method. The procedure includes use of a lattice pattern with either six or eleven cuts being made in each direction in the film of the substrate. Pressure-sensitive tape is then applied over the lattice and then removed. Adhesion is evaluated by comparison with descriptions and illustrations. The adhesion of the overcoat to the substrate was superior, in that no delamination on crosshatch adhesion test was demonstrated.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. An endless seamed flexible belt comprising a first end and a second end, each of said first end and said second end comprising a plurality of mutually mating elements which join in an interlocking relationship to form a seam, said belt comprising a substrate and said seam comprising a fluoropolymer adhesive.

2. An endless seamed flexible belt in accordance with claim 1, wherein said fluoropolymer adhesive of said seam comprises a conductive filler.

3. An endless seamed flexible belt in accordance with claim 2, wherein said filler is selected from the group consisting of carbon fillers, doped metal oxide fillers, and polymer fillers.

4. An endless seamed flexible belt in accordance with claim 3, wherein said carbon filler is selected from the group consisting of carbon, graphite, and fluorinated carbon.

5. An endless seamed flexible belt in accordance with claim 4, wherein said carbon filler is fluorinated carbon.

6. An endless seamed flexible belt in accordance with claim 3, wherein said doped metal oxide fillers are selected from the group consisting of antimony-doped tin oxide, antimony-doped titanium dioxide, and aluminum-doped zinc oxide.

7. An endless seamed flexible belt in accordance with claim 3, wherein said polymer fillers are selected from the group consisting of polytetrafluoroethylene, polypyrrole, and polyannaline.

8. An endless seamed flexible belt in accordance with claim 1, wherein said fluoropolymer adhesive comprises a fluorinated polyurethane.

9. An endless seamed flexible belt in accordance with claim 8, wherein said fluorinated polyurethane is selected from the group consisting of fluoroethylene vinyl ether polyurethanes, fluorinated epoxy polyurethanes, fluorinated acrylic polyurethanes, and mixtures thereof.

10. An endless seamed flexible belt in accordance with claim 1, wherein said substrate comprises a polymer selected from the group consisting of polyimide and polycarbonate.

11. An endless seamed flexible belt in accordance with claim 10, wherein said polyimide is a polyanaline polyimide.

12. An endless seamed flexible belt in accordance with claim 1, wherein said seam has a surface resistivity of from about $10^2$ to about $10^{15}$ ohms/sq.

13. An endless seamed flexible belt in accordance with claim 12, wherein said surface resistivity is from about $10^8$ to about $10^{12}$ ohm/sq.

14. An endless seamed flexible belt in accordance with claim 1, wherein said belt and said seam both have a resistivity of from about $10^8$ to about $10^{12}$ ohm/sq.

15. An endless seamed flexible belt in accordance with claim 1, wherein said substrate comprises a conductive filler.

16. An endless seamed flexible belt in accordance with claim 15, wherein said filler is selected from the group consisting of carbon fillers, doped metal oxide fillers, and polymer fillers.

17. An endless seamed flexible belt in accordance with claim 16, wherein said carbon filler is selected from the group consisting of carbon, graphite, and fluorinated carbon.

18. An endless seamed flexible belt in accordance with claim 17, wherein said carbon filler is a fluorinated carbon.

19. An endless seamed flexible belt in accordance with claim 16, wherein said doped metal oxide fillers are selected from the group consisting of antimony-doped tin oxide, antimony-doped titanium dioxide, and aluminum-doped zinc oxide.

20. An endless seamed flexible belt in accordance with claim 16, wherein said polymer fillers are selected from the group consisting of polytetrafluoroethylene, polypyrrole, and polyannaline.

21. An endless seamed flexible belt in accordance with claim 1, wherein said substrate comprises an overcoat thereon.

22. An endless seamed flexible belt in accordance with claim 21, wherein said overcoat comprises a fluoropolymer material.

23. An endless seamed flexible belt in accordance with claim 22, wherein said fluoropolymer adhesive comprises a fluorinated polyurethane.

24. An endless seamed flexible belt in accordance with claim 1, wherein said belt is an intermediate transfer belt.

25. An endless seamed flexible belt in accordance with claim 1, wherein said plurality of mutually mating elements are in the form of a puzzle cut pattern.

26. An endless seamed flexible belt in accordance with claim 25, wherein said mutually mating elements comprise a first projection and a second receptacle geometrically oriented so that said second receptacle on the first end receives the first projection on the second end and wherein said first projection on said first end is received by said second receptacle on the second end to form a joint between the first and second ends.

27. An endless seamed flexible belt in accordance with claim 26, wherein said first projection and said second receptacle are curved.

28. An endless seamed flexible belt comprising a first end and a second end, each of said first end and said second end comprising a plurality of mutually mating elements which join in an interlocking relationship to form a seam, said belt comprising a polyimide substrate, and said seam comprising a fluorinated polyurethane adhesive having conductive fillers dispersed or contained therein.

29. An image forming apparatus for forming images on a recording medium comprising:

a charge-retentive surface to receive an electrostatic latent image thereon;

a development component to apply toner to said charge-retentive surface to develop said electrostatic latent image to form a developed image on said charge retentive surface;

a transfer belt to transfer the developed image from said charge retentive surface to a copy substrate, wherein said transfer belt is an endless seamed flexible belt comprising a first end and a second end, each of said first end and said second end comprising a plurality of mutually mating elements which join in an interlocking relationship to form a seam, said transfer belt comprising a substrate and said seam comprising a fluoropolymer adhesive; and a fixing component to fuse said developed image to said copy substrate.

* * * * *